(12) United States Patent
Burzynski et al.

(10) Patent No.: US 6,361,309 B1
(45) Date of Patent: Mar. 26, 2002

(54) INJECTION MOLDING TOOL FOR PRODUCING A ROLLING BEARING CAGE FOR A LINEAR BEARING

(75) Inventors: Albert Burzynski, Dittelbrunn; Ludwig Edelmann, Sulzthal; Andreas Geyer, Mainberg; Hermann Glöckner; Erwin Jeschka, both of Schweinfurt; Holger Kristandt, Euerbach; Uwe Mayer, Münnerstadt; Henryk Velde, Werneck; Lothar Walter, Schweinfurt, all of (DE)

(73) Assignee: SKF Linearsysteme GmbH, Schweinfurt (DE)

( * ) Notice: Subject to any disclaimer, the term of this patent is extended or adjusted under 35 U.S.C. 154(b) by 0 days.

(21) Appl. No.: 09/482,524

(22) Filed: Jan. 14, 2000

(30) Foreign Application Priority Data

Jan. 15, 1999 (DE) .......................... 199 01 282

(51) Int. Cl.[7] .............................. B29C 45/44
(52) U.S. Cl. .................. 425/577; 249/175; 249/184; 425/DIG. 10; 425/DIG. 58
(58) Field of Search ................. 425/542, 577, 425/DIG. 10, DIG. 37, DIG. 119, DIG. 129, DIG. 58, DIG. 247; 249/175, 184

(56) References Cited

U.S. PATENT DOCUMENTS 4,844,628 A   7/1989  Knappe
4,956,142 A * 9/1990  Mangone, Jr. ....... 425/DIG. 58
5,096,403 A * 3/1992  Yanagishita ................. 249/175
5,122,052 A * 6/1992  Trame et al. ................ 249/184

FOREIGN PATENT DOCUMENTS

DE          36 35 261        10/1986

* cited by examiner

Primary Examiner—Tim Heitbrink
(74) Attorney, Agent, or Firm—Burns, Doane, Swecker & Mathis, L.L.P.

(57) ABSTRACT

An injection molding tool for producing a cage for a linear bearing in which several rolling elements are positioned in the cage in the direction of its longitudinal extent in the assembled state includes two tool halves each provided with protrusions. The protrusions extend into the cavity of the tool during the injection molding process and form a portion of a receiver pocket for receiving a rolling element. To make the injection molding process simple and economical, the protrusions are fixedly connected with the tool halves, with the protrusions being are shaped in such a way that, when acting together, they form holding elements for retaining the rolling elements in the receiver pockets in the cage when the injection molding tool is closed. The holding elements are thus integrated into the basic geometry of the cage. A rolling bearing cage for a linear bearing is provided with a plurality of receiver pockets for holding rolling elements next to each other in a manner arranged along the longitudinal extent of the bearing. The cage is also provided with holding elements integrated into the basic geometry of the cage for retaining the rolling elements within the receiving pockets.

14 Claims, 14 Drawing Sheets

INJECTION MOLDING TOOL FOR PRODUCING A ROLLING BEARING CAGE FOR A LINEAR BEARING

This application is based on and claims priority under 35 U.S.C. §119 with respect to German Application No. P 199 01 282.2 filed on Jan. 15, 1999, the entire content of which is incorporated herein by reference.

FIELD OF THE INVENTION

The present invention generally relates to linear bearings. More particularly, the present invention pertains to a rolling bearing cage for a linear bearing and an injection molding tool for producing a cage for a linear bearing.

BACKGROUND OF THE INVENTION

Injection molding tools for producing linear bearing cages are known. A rolling bearing cage made of an injection-moldable material is described in German Offenlegungsschrift 36 35 261 and is made in one piece of an endless strip injection-molded in sections in a tool. The recesses for receiving rolling bodies are provided with protrusions extending out of the base element of the cage and extend around the balls inserted into the cage to prevent the balls from falling out of the cage.

A similar version of a rolling bearing cage is known from DE 37 22 651 A1. Here, the base element of the cage is also provided with recesses which are intended to prevent the inserted balls from falling out.

One type of known linear bearing cage construction is illustrated in FIG. 1. The illustrated cross roller cage halves 11' are provided with openings for receiving rollers, with pairs of adjacent or successive rollers being offset by 90° with respect to each other. The cage 2' is shown in the disassembled state in FIG. 1 and in the assembled state in FIG. 2. The two parts 11' of the cage that are visible in FIG. 1 are connected, and for this purpose appropriate clip pins are provided. The receiver pockets 10' for the rolling elements as well as the holding protrusions 12' are thus formed, thereby preventing the rolling elements from falling out of the cage.

Another known version of a cage is illustrated in FIGS. 3 and 4. In this version, individual receiver elements 11' for individual rollers are injection-molded. A plurality of these individual elements 11' which are shown in FIG. 3 are clipped together to create the entire cage arrangement which is depicted in FIG. 4. The individual cage elements also have holding protrusions 12' which prevent the rolling body from falling out of the cage element.

On the one hand, the above mentioned cages are frequently needed in a very long one-piece version. On the other hand, the cages are also needed for quite small and numerous balls for increasing the support. It has been found that problems can arise when injection molding the cage.

The thermoplastic material injected into an injection molding tool must fill the entire mold cavity. This can cause problems, particularly in connection with cages for small balls, because the plastic material cools too rapidly and "freezes". Thus, the protrusions needed for holding the balls are not shaped with sufficient accuracy. Easy-flowing plastic materials, for example LCPs (liquid crystal polymer plastics), are as a general rule very expensive and typically do not have the required elasticity to be used in this context.

Furthermore, multiple cross roller cages are also known. However these cages must be connected by an additional assembly process. This means higher production costs because of the assembly tools, as well as specially formed snap-together elements on the cage. The snap-together elements also increase the division between the rolling bodies and therefore reduce the support capability.

Sheet metal cages are also known which typically do not have these same problems in connection with their production. However, the disadvantage of metal cages is that the production costs associated with manufacturing metal cages are relatively high, they display relatively low elasticity and typically provide a ball guidance that is not as good as a plastic cage.

Known injection molding tools for producing cages for linear bearings have the further disadvantage that it is frequently necessary to accomplish the shaping of the holding protrusions for the rolling elements by way of complicated injection molding tools designed with movable slider elements. Although it is possible by way of these tools to relatively precisely produce the desired shape of the holding protrusions as well as the stop faces of the rolling bodies, the required injection molding tool is quite complicated and therefore rather expensive.

In light of the foregoing, a need exists for an injection molding tool that is able to produce a relatively exact shaping of the holding projections as well as the stop faces for the rolling bodies.

A need also exists for an injection molding tool having a design that is more simple than other known injection molding tools to thereby produce cages in a more cost effective manner.

It would also be desirable to produce rolling bearing cages for use in linear bearings in such a way that relatively long cages, particularly suited for receiving very small balls or respectively rollers, can be reliably and reproducibly made, without the problems associated with other known injection molding techniques.

SUMMARY OF THE INVENTION

One aspect of the invention involves an injection molding tool for producing a one-piece cage for a linear bearing in which several rolling elements are positioned in the one-piece cage in a direction along a longitudinal extent of the one-piece cage. The injection molding tool includes first and second tool halves between which is defined a cavity of the tool which receives injection molding material during injection molding of the one-piece cage. The first tool half is provided with a plurality of first protrusions fixedly connected with the first tool half and extending into the cavity of the tool during the injection molding of the one-piece cage, and the second tool half is provided with a plurality of second protrusions fixedly connected with the second tool half and extending into the cavity of the tool during the injection molding of the one-piece cage. Each of the first and second protrusions form a portion of a receiver pocket which is adapted to receive one of the rolling elements. The first and second protrusions are configured to form holding projections associated with each receiver pocket and integrated with the cage for holding the rolling elements in the cage.

The injection molding tool is embodied in such a way that a linear bearing cage can be produced by injection molding having guide faces as well as holding projections or protrusions for the individual rolling elements which do not project out of the basic geometry of the cage such as is the case with the construction described above in German Offenlegungsschrift 36 35 261. Moreover, the protrusions on the tool halves work together in such a way that they form receiver pockets for receiving the rolling bodies in the cooperating position and in the process also define the required holding protrusions for the rolling bodies.

An alternative version of the injection molding tool which is suitable for linear bearing cages which are provided with rolling elements in the form of rollers is designed to produce a one-piece cage, with the one set of protrusions being fixedly connected with one tool half and the other set of protrusions being fixedly connected with the other tool half. The protrusions on the tool halves are shaped in such a way that, when acting together, they form holding protrusions or elements for the rollers in the cage when the injection molding tool is closed, with such holding protrusions being integrated into the basic geometry of the cage. The protrusions on the tool halves are divided from one another, on the surface on which they lie next to each other when the injection molding tool is closed, at an angle of greater than zero degrees with respect to the closing direction of the injection molding tool.

In accordance with this aspect of the invention, the protrusions are in contact at a defined contact angle on the surface with which they come into contact when the injection molding tool is closed. As a result, the spherical embodiment of the holding protrusions, as well as of the contact surface of the rolling body with the cage, is in a divided form, by way of which it becomes possible to create an injection molding tool having advantages over other known techniques.

The protrusions can be formed without an undercut so that the cage can be freely unmolded after the injection molding process. In this way, a simple unmolding of the finished injection-molded cage can be performed without having to rely on the elasticity of the cage material. The injection molding tool is advantageously designed as a multiple mold, so that at least two cages can be produced per injection molding cycle.

The exact shaping of the cage geometry inside the receiver pockets for the rolling bodies is made easier in that each protrusion has a first section for forming a holding protrusion, a second section for forming a rolling body section, and a third section for forming the remaining portion of the receiver pocket. The protrusions are preferably formed so that they each respectively constitute one-half of a receiver pocket for the rolling elements.

A considerable simplification of the production of the injection molding tools can be realized by designing the tool so that the protrusions for forming the receiver pockets for rolling elements which lie one behind the other in the longitudinal direction of the cage are formed by one rail supported by one tool half. It is preferable that the respective rails of the two tool halves are designed to be identical to one another or geometrically equal. It is also possible to form each tool half with at least two rails for forming the geometry for a cage with at least two rows.

With this aspect of the invention, it is advantageously possible to create a precisely operating injection molding tool in a simple way. The protrusions which are needed for forming the receiver pockets for the rolling bodies are arranged on the rail, with the rail being very easily processed by way of finishing techniques. For example, it is possible to relatively exactly produce the contours of the protrusions by die erosion, and the lateral surfaces of the rails or the contact faces of the protrusions, by grinding. The rail finished in this way can then be inserted into the respective tool half of the injection molding tool and fixed in place. If two protrusions respectively define one half of the pocket geometry, it becomes possible in a very advantageous manner to divide the finished rails by a longitudinal cut and then fasten them on the tool halves. With multiple-row cages (for example double row cages), a finished rail can be divided into four equal parts which then, working together, are fastened on the halves of the injection molding tool. Through appropriate axial offset of the rails, it is possible in a very simple manner to produce the injection molding tool for producing cross roller cages.

A rolling bearing cage for a linear bearing produced in accordance with the present invention is in the form of a one-piece rolling bearing cage provided with a plurality of receiver pockets spaced from one another along a longitudinal extent of the cage. A rolling element is positioned in each of the receiver pockets, with the receiver pockets being provided with holding projections that hold the rolling elements within the receiver pockets of the cage and prevent the rolling elements from falling out of the receiver pockets. The holding projections are integrated into the cage to constitute an integral portion of the cage.

A rolling bearing cage for a linear bearing produced in accordance with another aspect of the present invention is in the form of a one-piece rolling bearing cage provided with a plurality of receiver pockets spaced from one another along a longitudinal extent of the cage. A rolling body is positioned in each of the receiver pockets, and the receiver pockets are provided with holding projections that retain the rolling bodies within the receiver pockets of the cage and prevent the rolling bodies from falling out of the receiver pockets. The holding projections are formed integrally with the cage. The receiver pockets are disposed in a first area of the cage that has a width at least 50% of the diameter of the rolling bodies, and the width in the other areas of the cage is less.

By virtue of the present invention, "freezing" of the thermoplastic material during injection molding is not as likely to occur and is made more difficult because the cage body is made quite thick and solid. Accordingly, the thermoplastic material does not solidify as quickly as with other known cages. The width of the cage in the area of the receiver pockets is preferably at least 60% of the diameter of the rolling elements, and the cage in all areas other than in the area of the receiver pockets possesses a width that is at most 90% of the width of the cage in the area of the receiver pockets.

The holding projections for retaining the rolling elements do not project out of the cage, and are integrated into the areas of the receiver pockets of the cage. This is particularly useful when the length of the cage is relatively long, on the order of at least thirty times the diameter of the rolling elements.

The material to form the cage is material that can be injection molded, preferably injection molded thermoplastic material. The rolling bearing cage can be designed in such a way that at least two parallel rows of receiver pockets for receiving rolling elements are arranged in the cage to produce a so-called multi-row bearing.

The injection molding tool in accordance with the present invention makes it possible to produce a linear bearing cage in a particularly simple and therefore cost-effective manner, while still assuring that the cage geometry is relatively perfectly designed. This is particularly so with respect to the receiver pockets for the rolling bodies, i.e. the contact surface of the rolling bodies with the cage, and with respect to the holding projections which prevent the rolling bodies from falling out of the cage.

The injection molding process can be carried out in a very stable, and therefore reproducible manner, because the "freezing" of the injected material is much less likely to occur. It is thus possible to relatively perfectly injection-mold linear bearing cages which are very long in comparison to their width.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
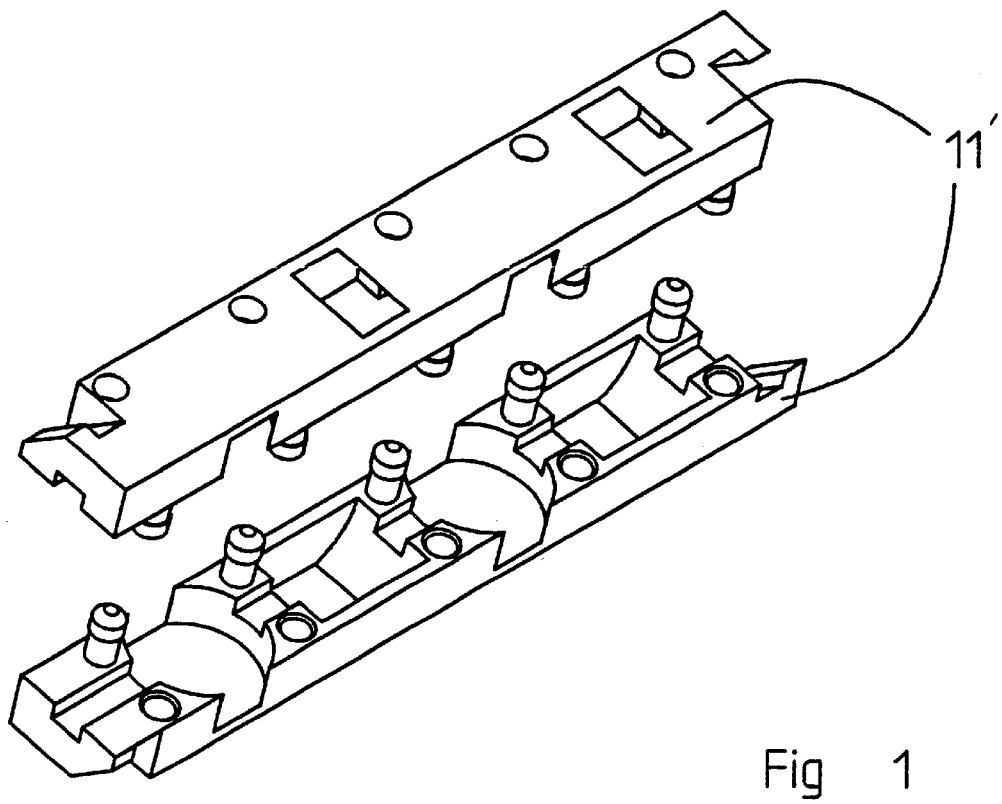
FIG. 1 is a top perspective view of a known linear bearing cage in a disassembled state.
Figure 2:
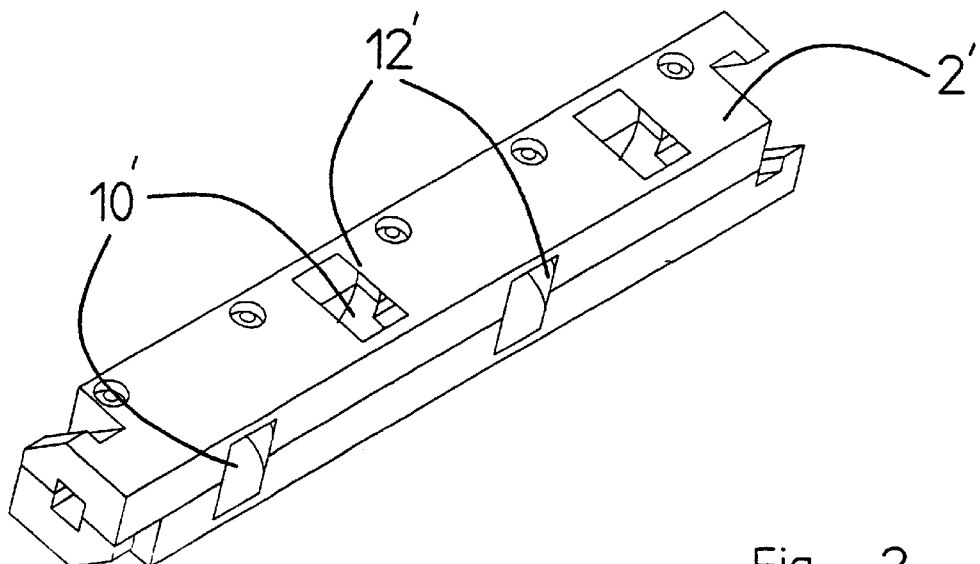
FIG. 2 is a top perspective view of the linear bearing cage shown in FIG. 1 in an assembled state.
Figure 3:
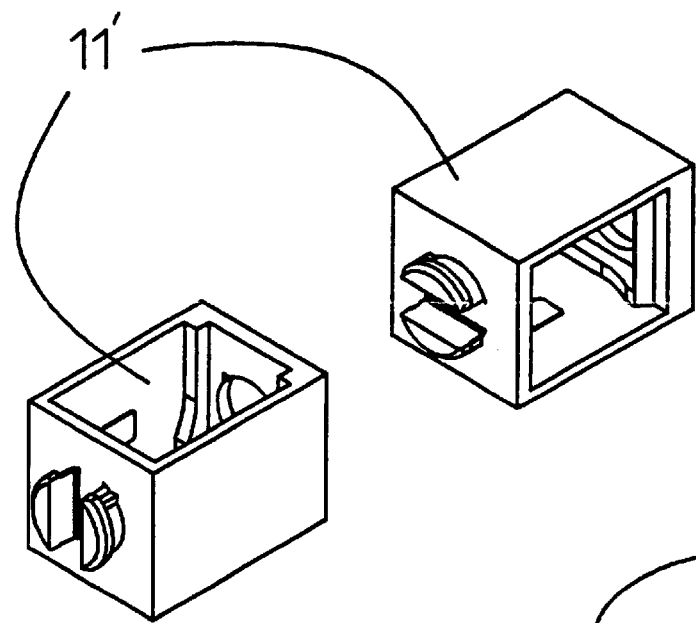
FIG. 3 is a top perspective view of another known linear bearing cage in a disassembled state.
Figure 4:
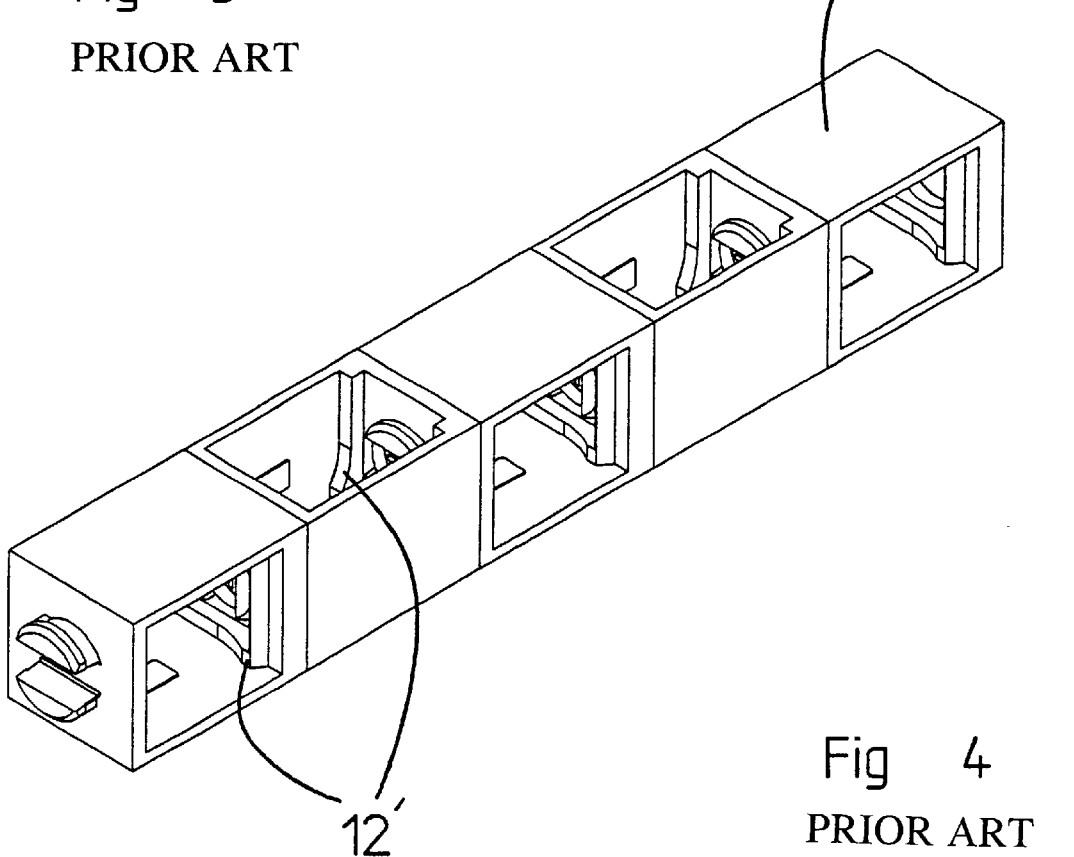
FIG. 4 is a top perspective view of the linear bearing cage shown in FIG. 3 in an assembled state.
Figure 5:
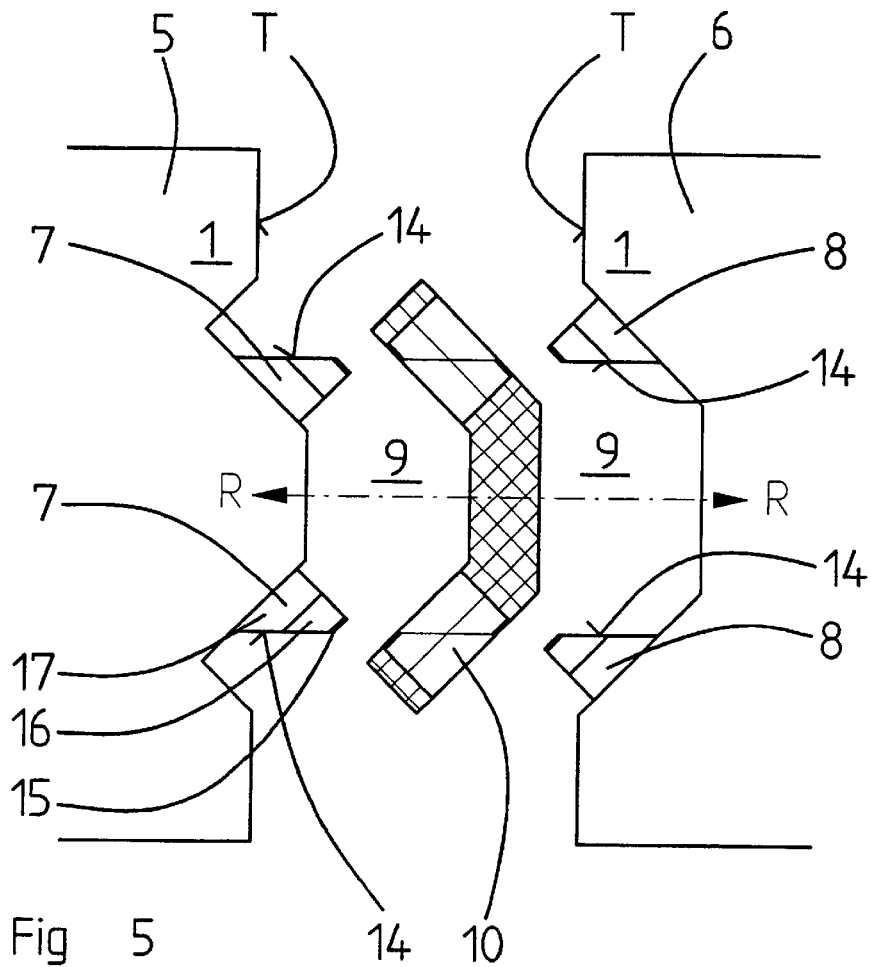
FIG. 5 is a lateral side view of an opened injection molding tool according to the present invention with the injection-molded linear bearing cage located inside the tool.

An injection molding tool 1 in accordance with the present invention for injection molding a linear bearing cage according to the present invention is illustrated in FIG. 5. The tool consists of two tool halves 5, 6 which are adapted to contact each other along a tool separation plane T during injection molding. The movement of the injection molding tool 1 is identified by R, with the two halves 5, 6 moving towards each other to close the tool and moving away from each other to open the tool. When the halves 5, 6 are moved towards one another to close the tool, a cavity 9 within the tool is formed.

To injection mold the cage 2 with the receiver pockets 10 that are adapted to receive rolling bodies, the one tool half 5 is provided with a pair of protrusions 7, 7 and the other tool half 6 is provided with a pair of protrusions 8, 8. These protrusions 7, 8 for shaping the pockets 10 of the cage move into the cavity 9 of the tool when the tool closes. In the illustrated version, the cage is intended to be used in a double row linear bearing and so the pair of protrusions are provided on each of the tool halves 5, 6. The protrusions 7, 8 each include a contact surface 14. With the injection molding tool 1 closed, the contact surface 14 of each protrusion 7, 8 contacts the respective contact surface 14 of the corresponding protrusion, and in this way form the recess 10 in the cage for receiving the rolling element.

The entire interior geometry of each receiver pocket 10 is defined by the protrusions 7, 8. For this purpose, the protrusions 7, 8 each have three successive sections 15, 16, 17 by which the parts of the receiver pocket 10 are produced. The first section 15 determines the size of the rolling body enclosure of the holding protrusion, which prevents the rolling body from falling out of the receiver pocket 10. The second section 16 defines the spherical shape on which the rolling body can rest against the cage. The third section 17 corresponds to the geometry of the rolling body, advantageously extends as far as the center of the receiver pocket 10 and, in cross-section parallel with the tool separating plane, has for example a semicircular shape for balls or a square shape for rollers.

Figure 6:
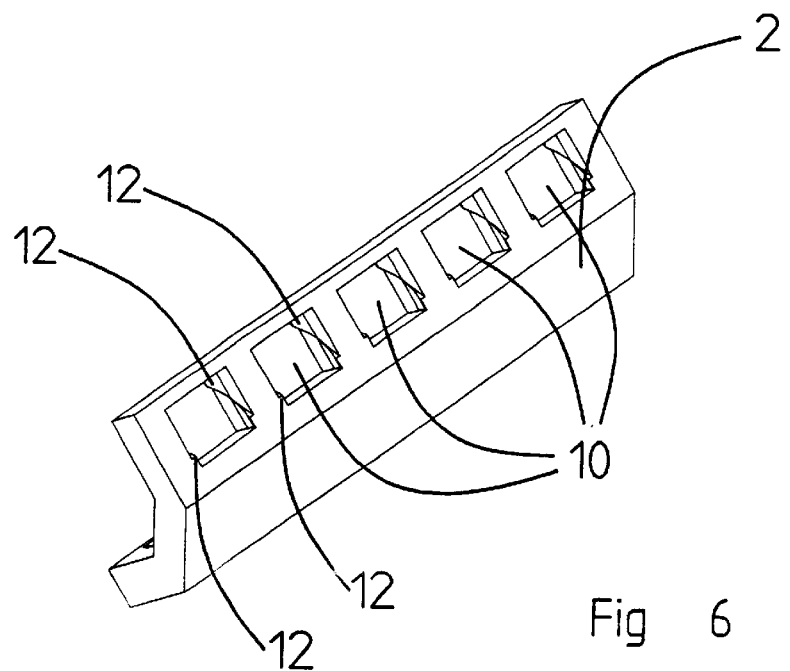
FIG. 6 is a top perspective view of the injection-molded linear bearing cage of the present invention produced using the tool shown in FIG. 5.

The finished injection-molded cage 2 is shown in FIG. 6. As can be seen, the cage possesses a generally V-shaped cross-section with a slightly flattened bottom region between the two legs in which the received pockets 10 are formed. The receiver pockets 10 are formed with the holding protrusions or holding projections 12 that retain the rolling elements within the cage and prevent the rolling elements from falling out.

Figure 7:
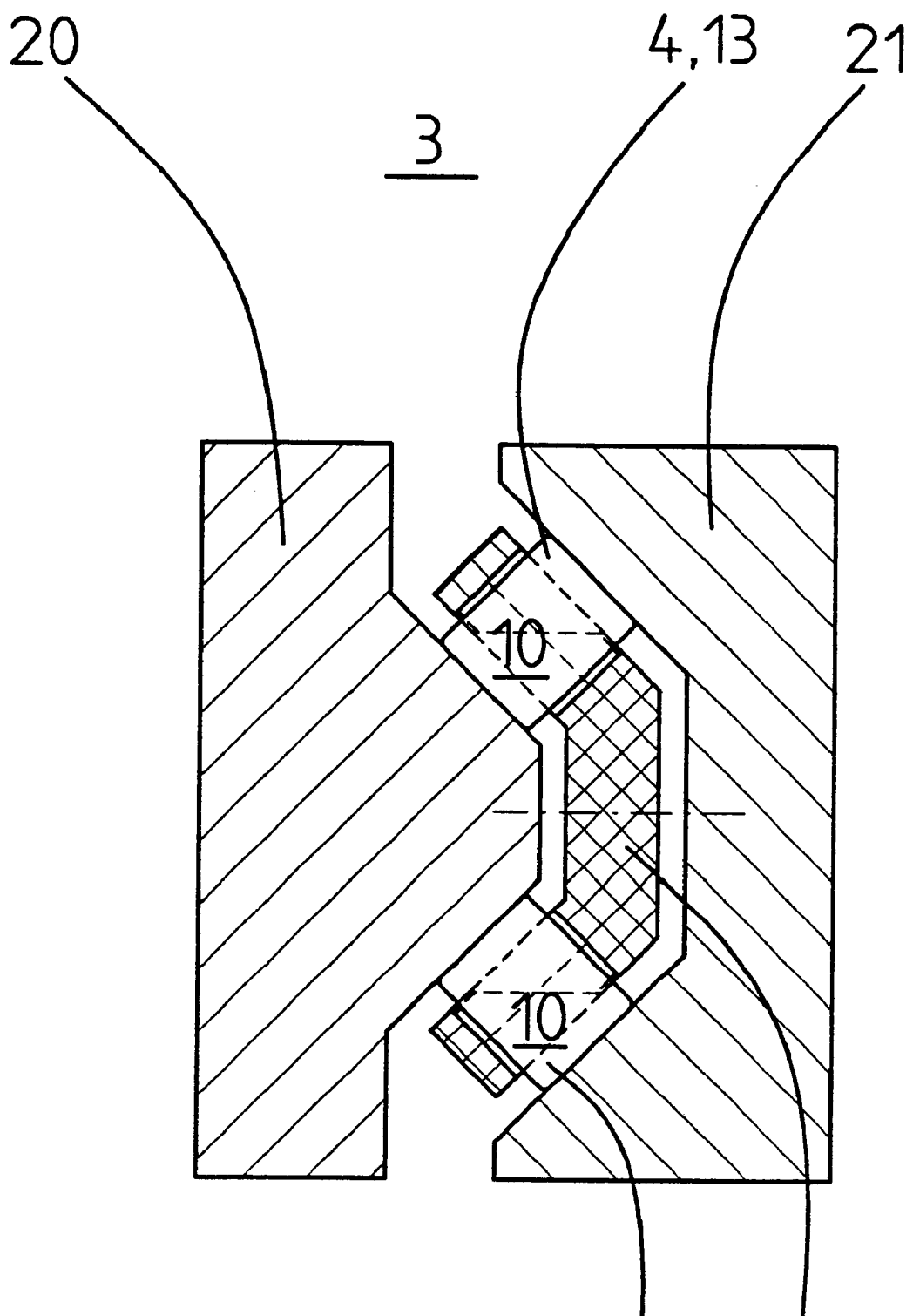
FIG. 7 is a lateral side view of a linear bearing in which is installed the cage according to the present invention as shown in FIG. 6.

The assembled linear bearing 3 is illustrated in FIG. 7. In the assembled state, the cage 2 is equipped with rollers or rolling elements 4, 13. The cage 2, together with the rolling elements 4, 13, is arranged between two support rails 20, 21 which can move in the axial direction in relation to each other.

Figure 8:
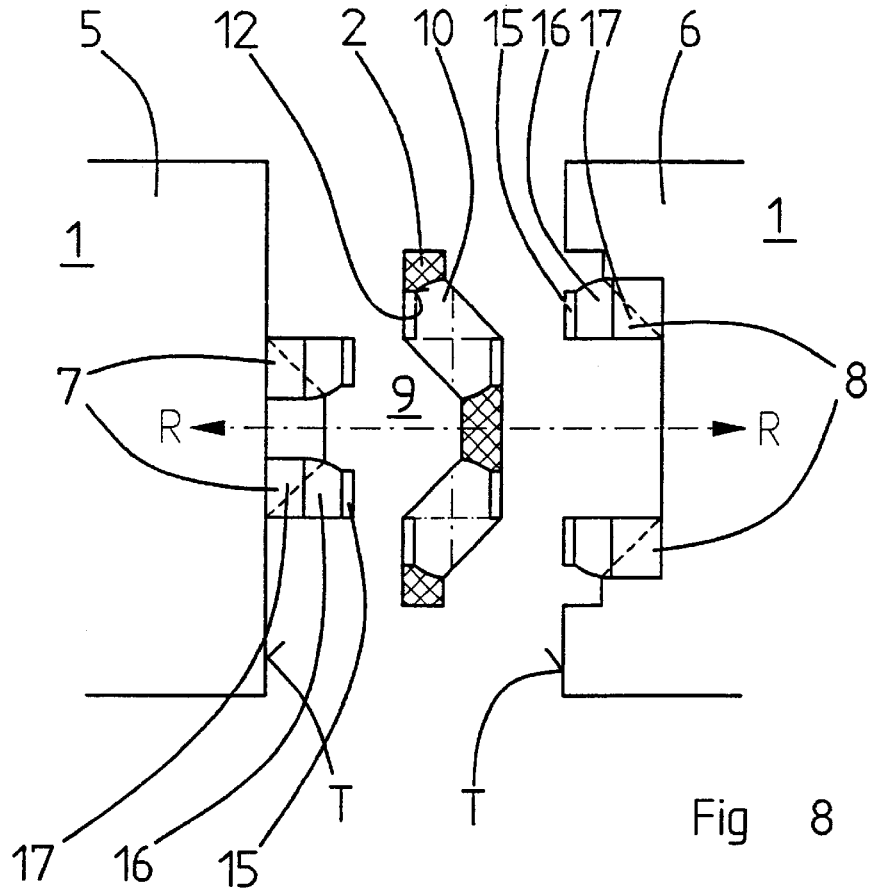
FIG. 8 is a lateral side view of a different embodiment of the injection molding tool according to the present invention in an opened state with the injection-molded linear bearing cage located inside the tool.
Figure 9:
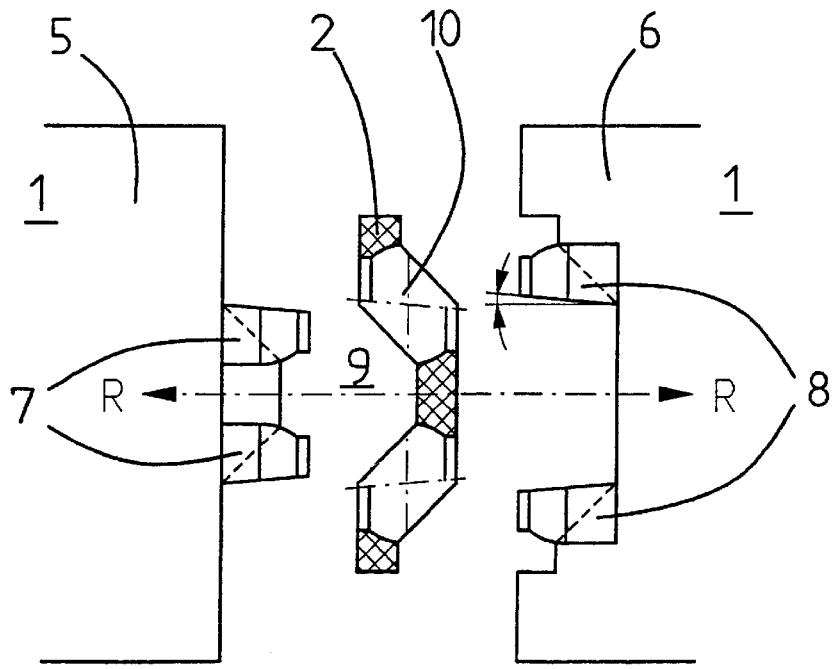
FIG. 9 is a lateral side view of a slightly different embodiment of the injection molding tool according to the present invention in an opened state with the injection-molded linear bearing cage located inside the tool.

FIGS. 8 and 9 illustrate a slightly modified version of the injection molding tool for producing the cage. As illustrated in FIG. 8, the protrusions 7, 8 are shaped to define in the receiver pocket 10 a spherical profile for contact with a ball in the rolling bearing cage. FIG. 9 shows the protrusions 7, 8 being similarly shaped, except that the protrusions 7, 8 meet at a defined angle at their common contact surface. This can be advantageous from the standpoint of facilitating and making easier the opening and closing of the injection molding tool. Thus, in the embodiment shown in FIG. 8, the contact surface of each protrusion 7, 8 is parallel to the opening and closing direction of the tool halves 5, 6 (represented by the line R—R in FIG. 8) where in the FIG. 9 version, the contact surface of each protrusion 7, 8 forms a relatively small acute angle with respect to the opening and closing direction of the tool halves 5, 6. FIGS. 8 and 9 also show how the cooperating pairs of protrusions 7, 8 respectively cooperate in halves for defining the receiver pocket 10.

From the standpoint of production techniques, the injection molding tool 1 according to the present invention can be produced in a particularly simple manner by utilizing specially designed rails 18, 19 such as represented in FIGS. 10–13. The rail 18 is provided with a row of spaced apart protrusions 7 while the rail 19 is also provided with a row of spaced apart protrusions 8. Each of the protrusions 7, 8 has the first, second and third sections 15, 16, 17 described above. These sections 15, 16, 17 define the interior geometry of the receiver pockets of the cage.

Figure 10:
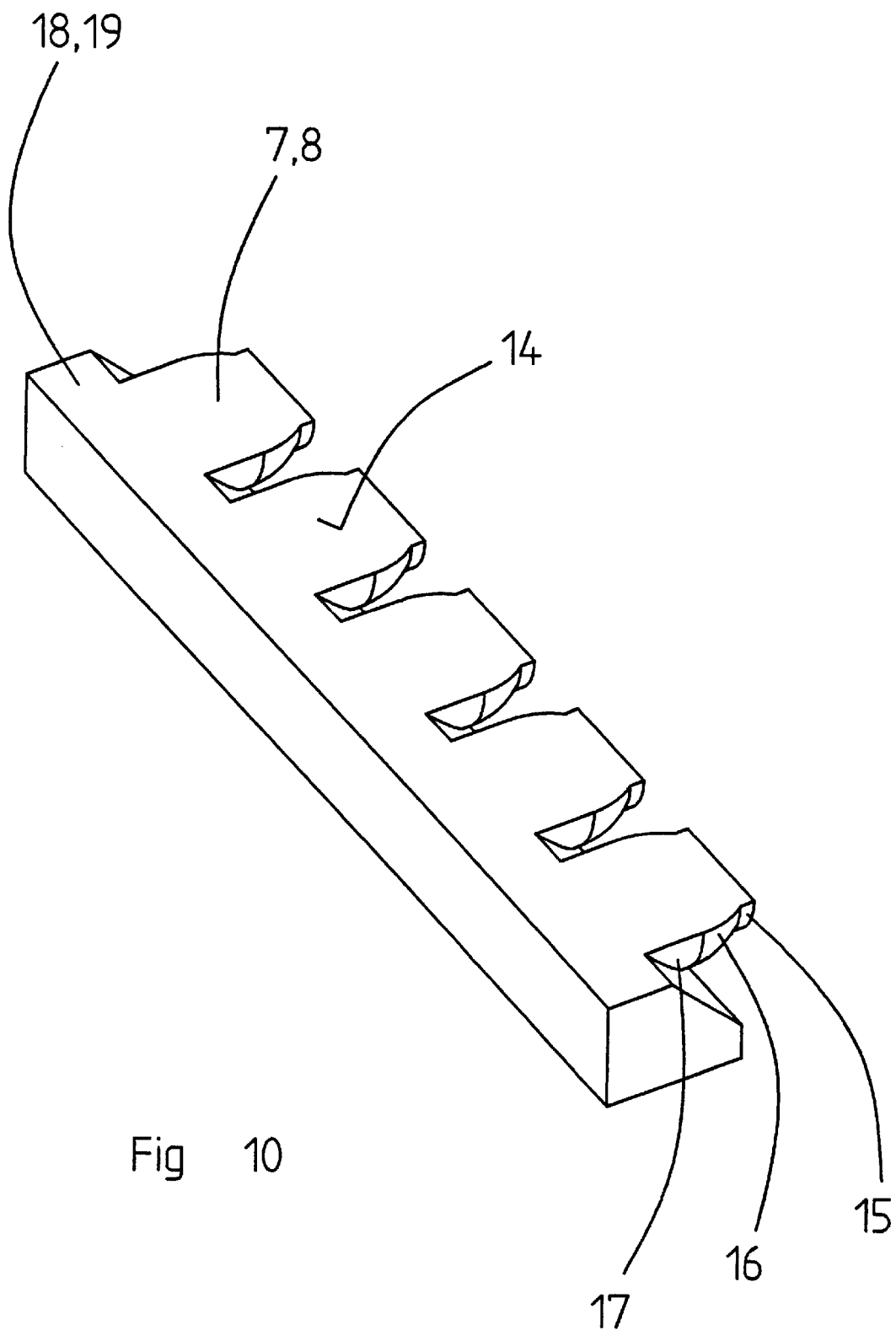
FIG. 10 is a top perspective view of a rail with protrusions for installation in an injection molding tool in accordance with the present invention.
Figure 11:
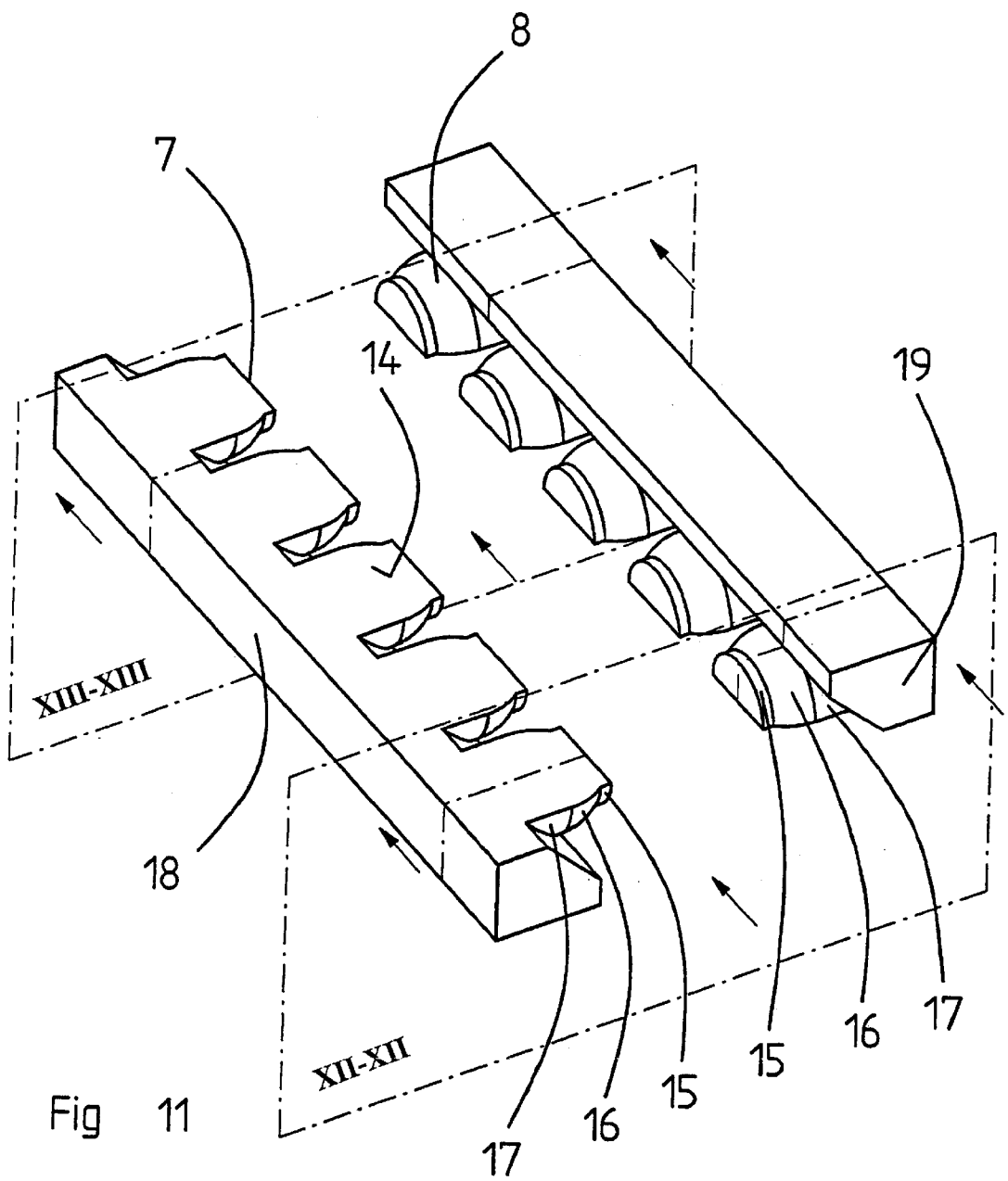
FIG. 11 is a top perspective view of two cooperating rails for installation in an injection molding tool in accordance with the present invention.
Figure 12:
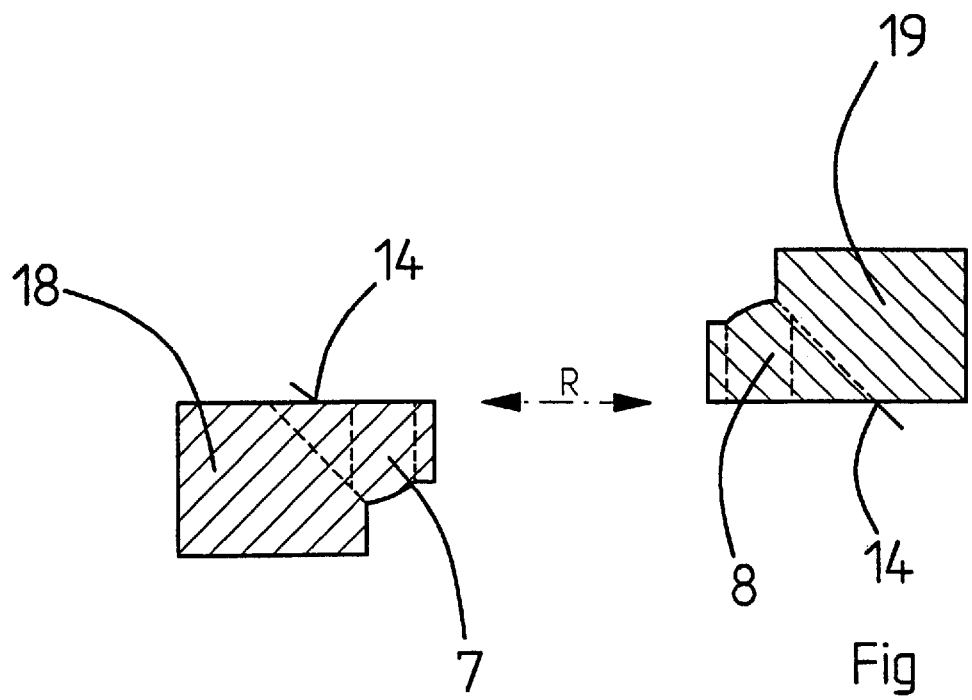
FIG. 12 is a cross-sectional view along the section plane XII—XII in FIG. 11.
Figure 13:
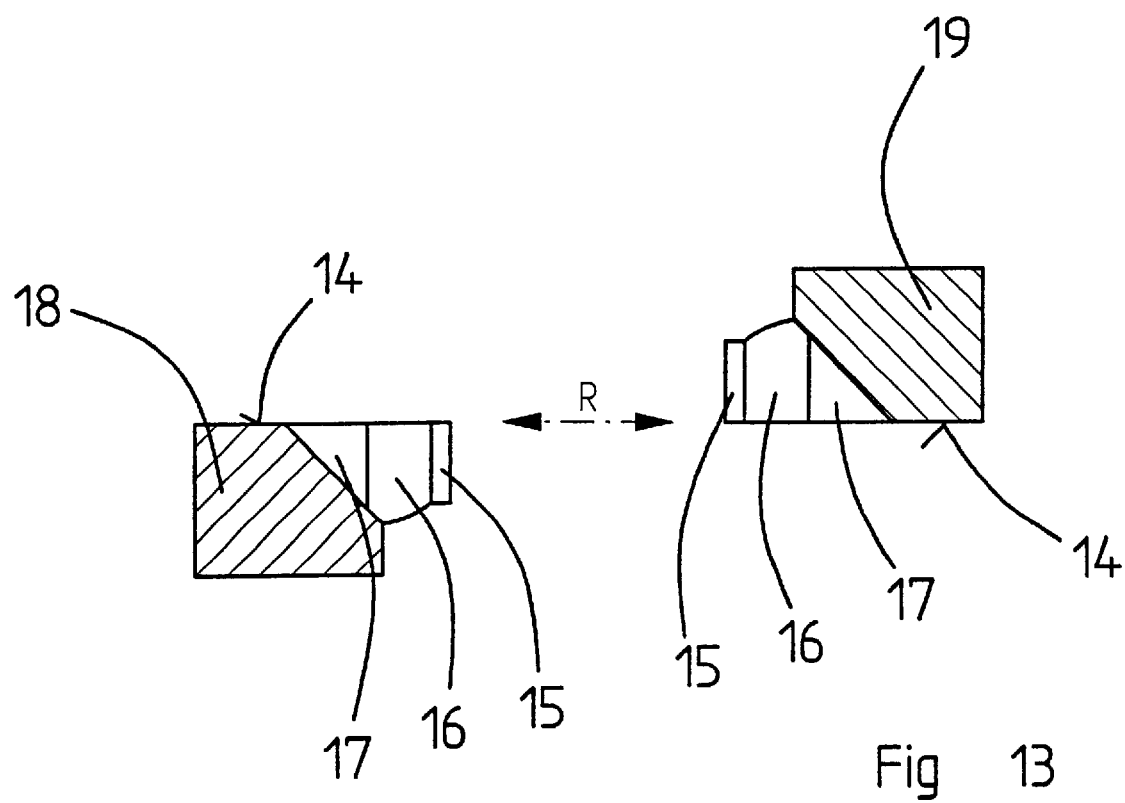
FIG. 13 is a cross-sectional view along the section plane XIII—XIII in FIG. 11.

The protrusions 7, 8 act together in the injection molding tool in such a way that they each respectively symmetrically constitute one-half of a receiver pocket. As a result, from the standpoint of advantageous production technology, a rail as represented in FIG. 10 merely needs to be cut apart into, for example, two pieces along a plane perpendicular to its longitudinal extent so that it can be installed in the injection molding tool as one of the rails 18, 19. The other cut part can then be used as the other rail. Thus, a rail element can be manufactured with double the length needed for one rail 18 or 19, and cut into two pieces each having the necessary length of the rail. As can be seen in FIG. 11, the protrusions 7, 8 on the two oppositely located rails 18, 19 complement each other in shape so that the pocket geometry is formed. Details of this can be seen from FIGS. 12 and 13 which represent cross-sections along the section lines XII—XII and XIII—XIII in FIG. 11.

Figure 14:
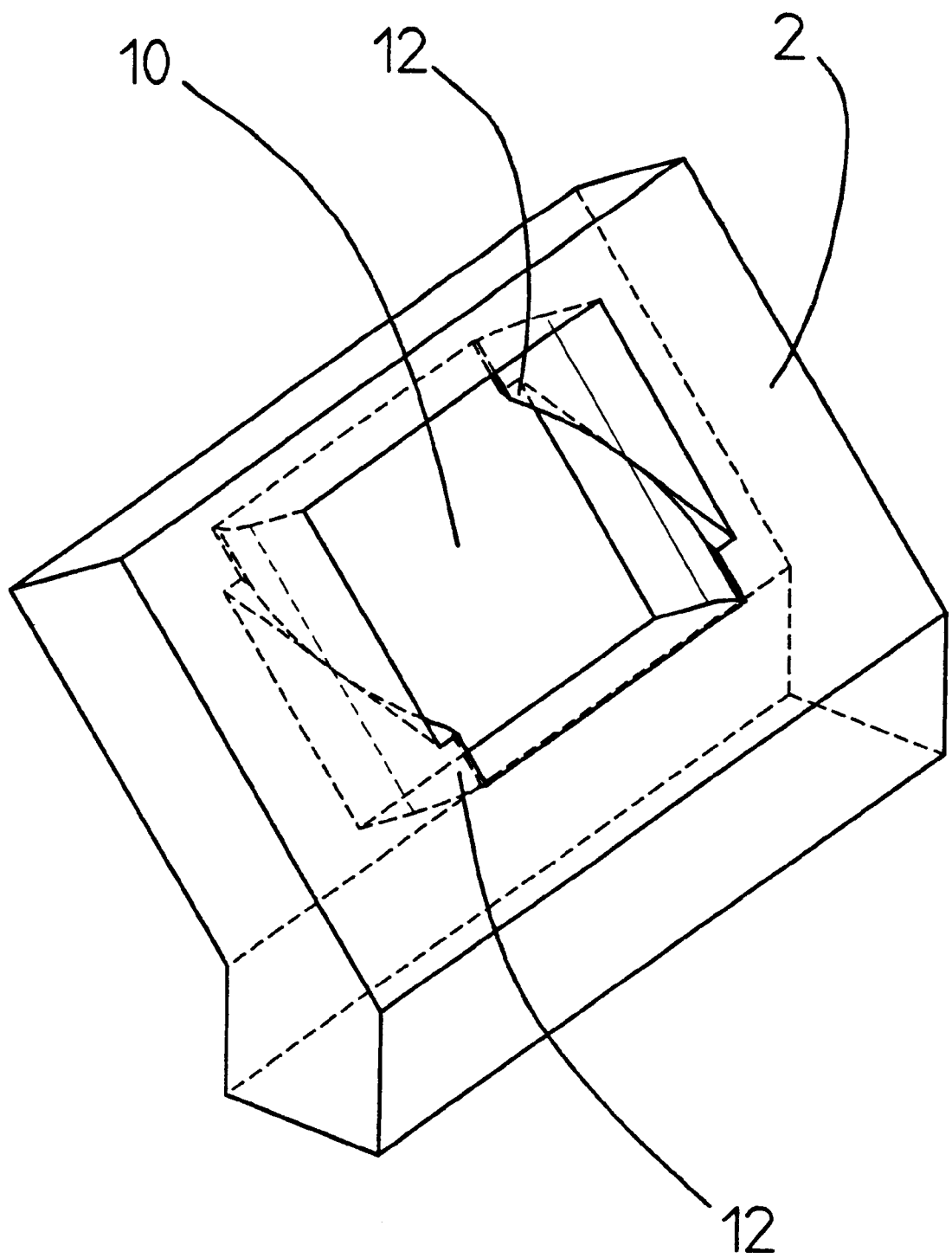
FIG. 14 is an enlarged perspective view of an injection-molded receiver pocket in the linear bearing cage according to the present invention.

The details of the receiver pocket 10 of the cage 2 (or 11) are illustrated in FIG. 14. All hidden lines have also been drawn in the drawing figure in dashed lines. FIG. 14 illustrates particularly well how the holding protrusions or holding projections 12 are designed to prevent a rolling body inserted into the cage from falling out.

Figure 15:
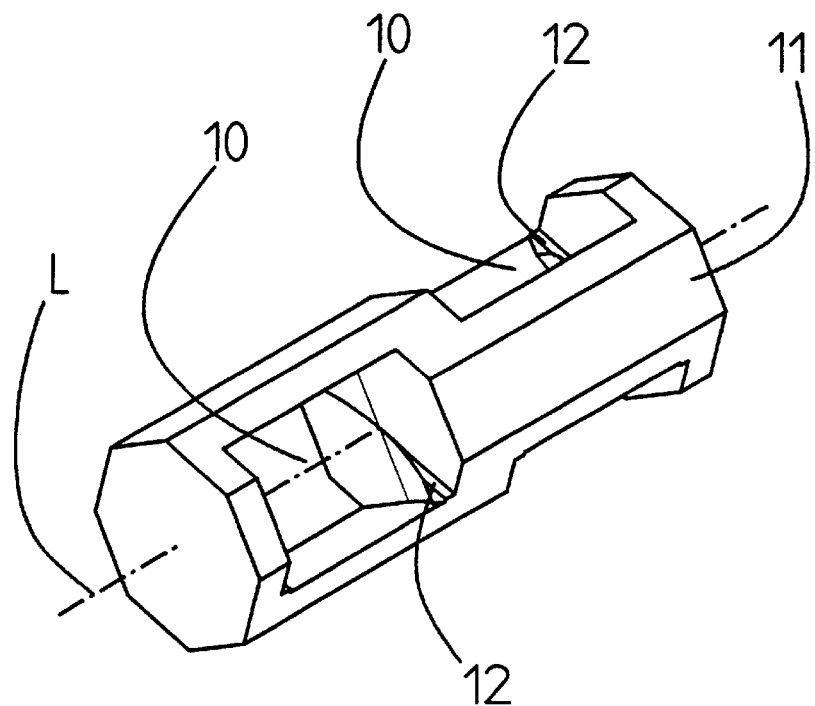
FIG. 15 is top perspective view of a portion of a cross roller cage produced in accordance with the present invention.
Figure 16:
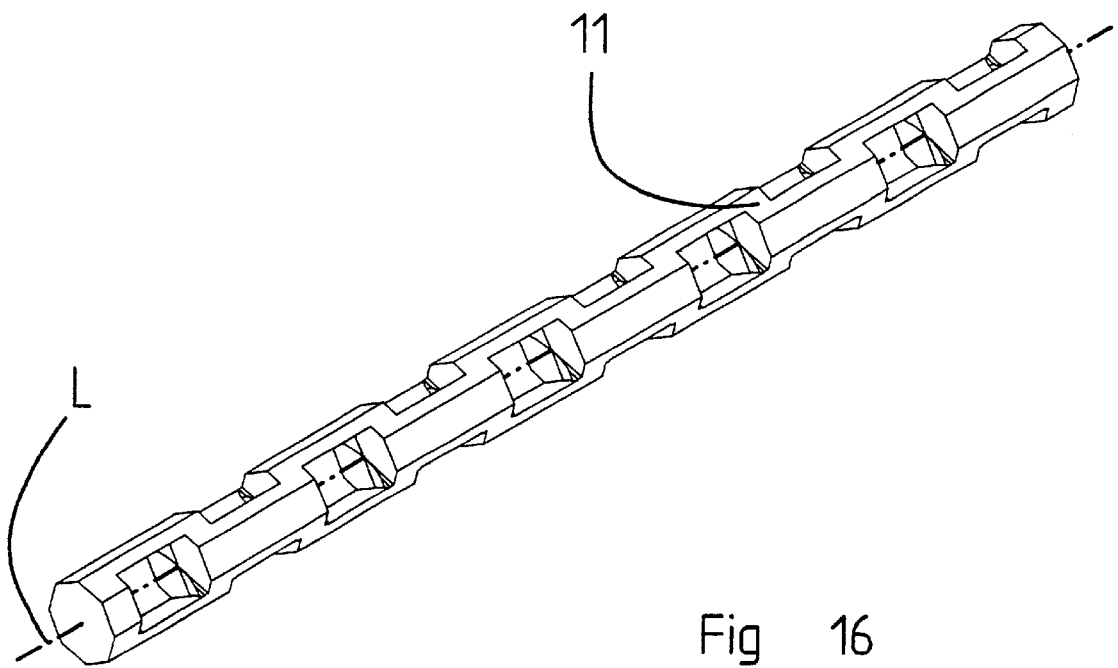
FIG. 16 is a top perspective view of the cross roller cage shown in FIG. 15 illustrating a greater portion of the cross roller cage.

The injection molding tool in accordance with the present invention can be particularly advantageously used for producing cross roller cages for linear bearings. Such a cross roller cage is illustrated in FIGS. 15 and 16. FIG. 16 illustrates the entire cage while FIG. 15 illustrates a part of the entire cage. In a known manner, the cage 11 possesses receiver pockets 10 for the rolling bodies. The holding protrusions or holding projections 12 are formed by the corresponding protrusions 7, 8 described above. As can be seen, the cage is relatively massive and has a relatively large cross-section along the longitudinal axis L, by means of which the thermoplastic molten mass is prevented from prematurely "freezing" in a manner that would cause the cage geometry to be insufficiently formed.

Figure 17:
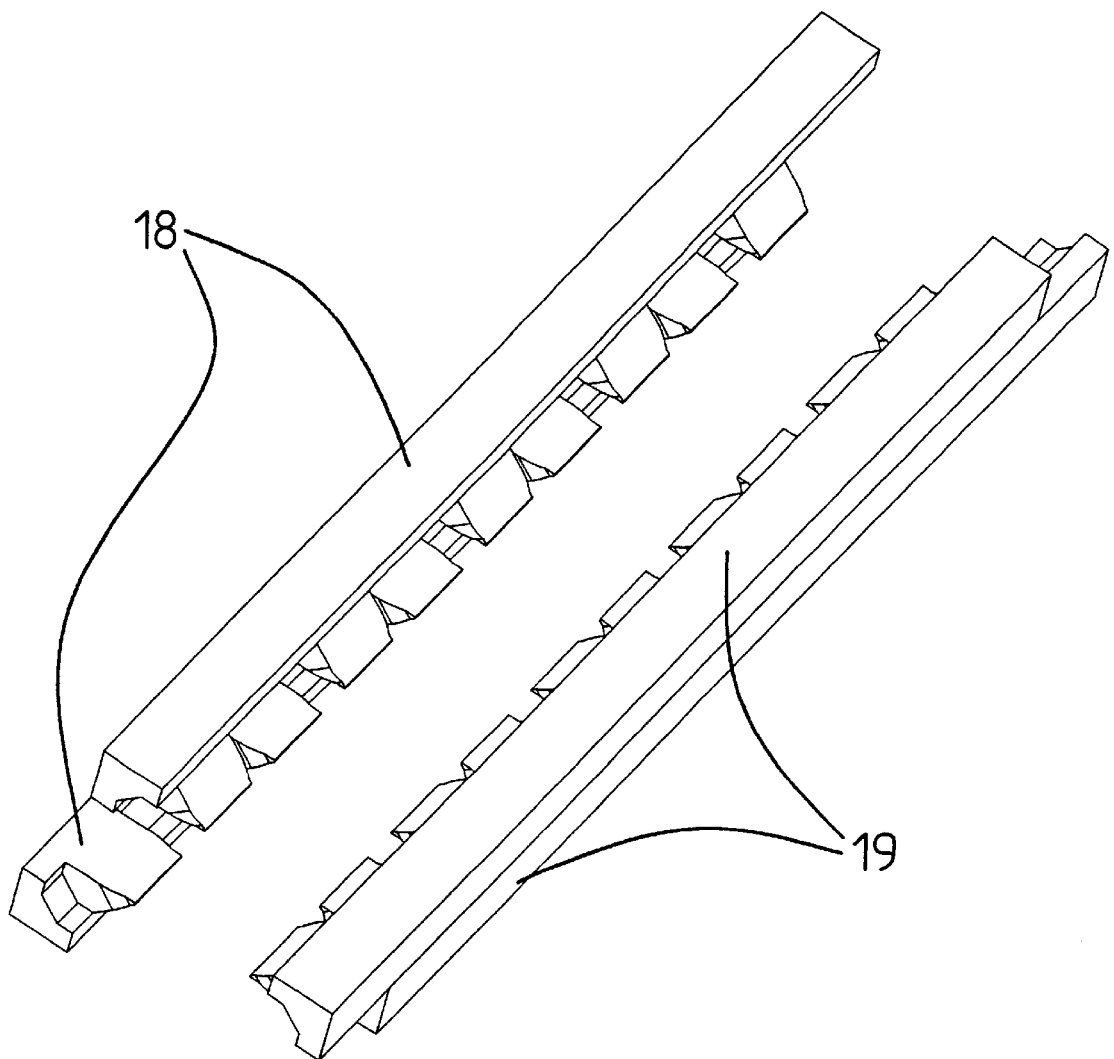
FIG. 17 is a top perspective view of four cooperating rails.
Figure 18:
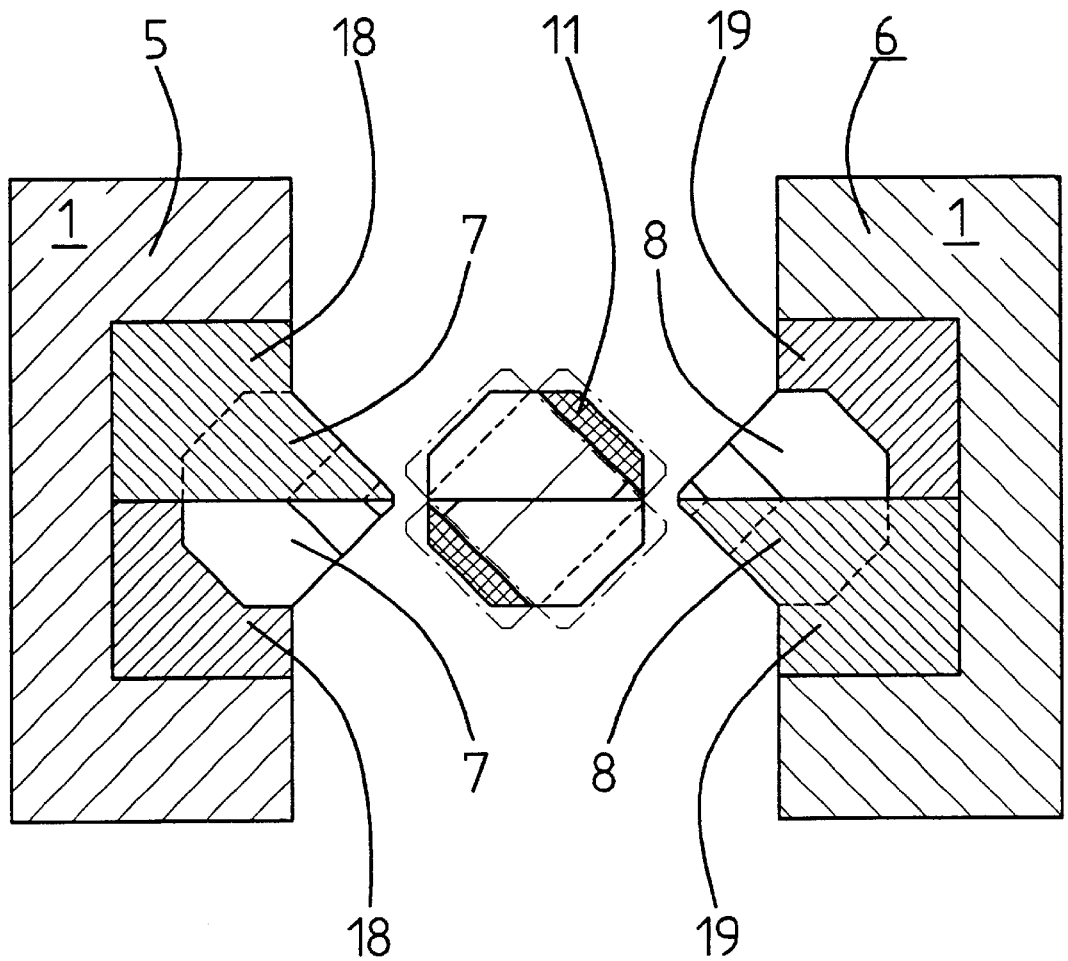
FIG. 18 is a lateral side view of an opened injection molding tool similar to FIG. 5 in which the four rails shown in FIG. 17 are illustrated in the installed state.

The way the rails 18, 19 cooperate when a cross roller cage such as shown in FIGS. 15 and 16 is produced can be seen in FIG. 17. A total of four equally shaped rails act together, with one set of rails as well as the other set of rails, each consisting of two rails, being formed from two partial rails which are axially offset in relation to each other in the manner illustrated. The way in which the sets 18, 19 of rails are mounted in the injection molding tool 1 is illustrated in FIG. 18. FIG. 18 also illustrates the cross roller cage 11 in the opened injection molding tool 1.

Figure 19:
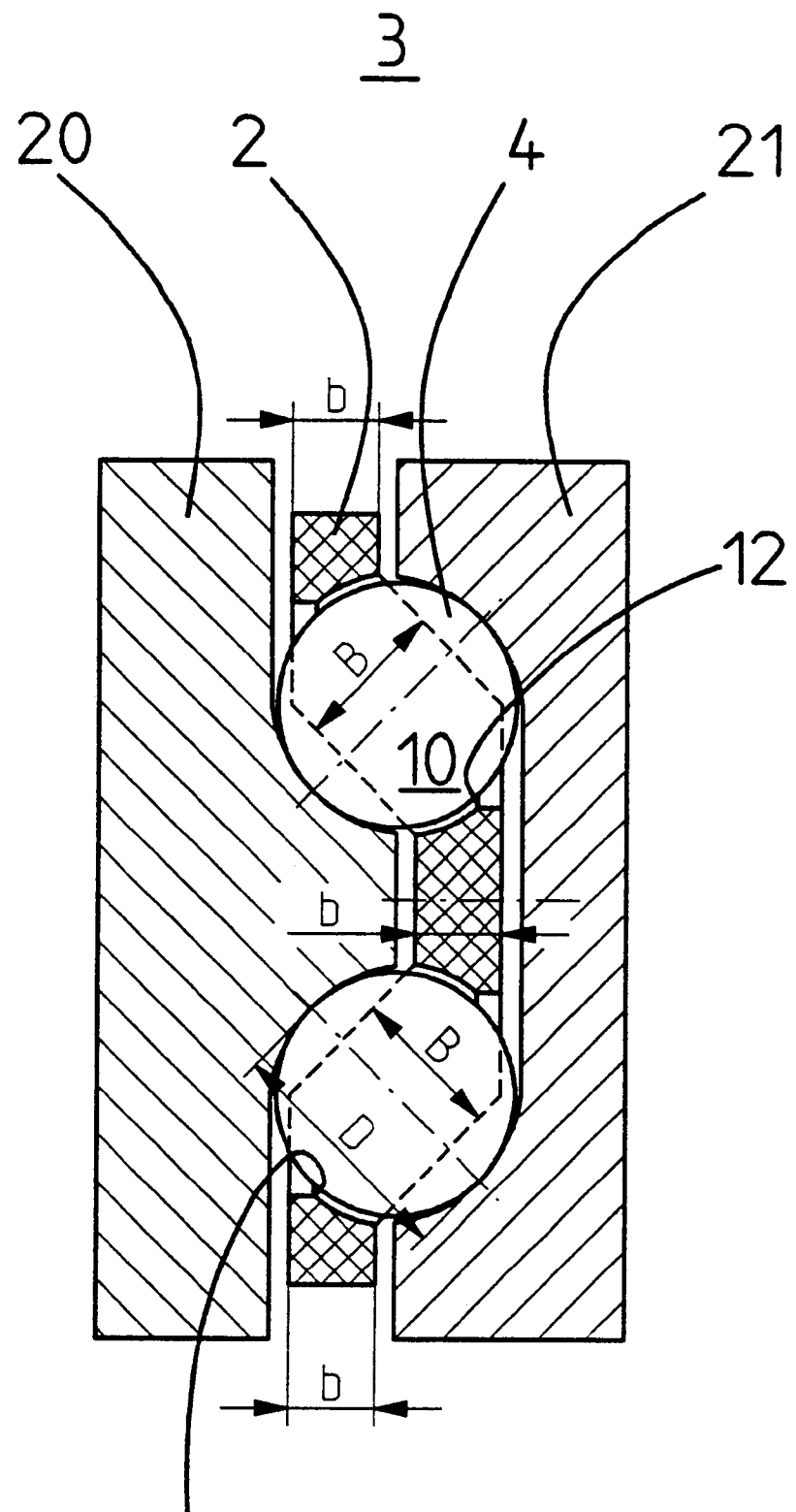
FIG. 19 is a lateral side view of a linear bearing.

The "freezing" of thermoplastic molten material during the injection-molding of linear bearing cages, and long linear bearing cages in particular, is prevented by way of the cage geometry shown in FIG. 19 in particular. FIG. 19 illustrates a linear bearing 3 in cross-section. The linear bearing 3 includes two bearing rails 20, 21, between which balls 4 are positioned to form two parallel rows of balls. The balls 4 are positioned at a distance spaced from each other and are held by the cage 2 in receiver pockets 10 that are formed in the cage 2. The balls 4 possess a diameter D. As can be seen from FIG. 19, in the area of the cage in which the balls 4 are received (i.e., the area of the cage in which the receiver pockets are formed), the cage 2 has a relatively large clear width B. In all other areas of the cage (i.e., in all areas of the cage other than the area where the receiver pockets are formed), the cage possesses a width less than B. These other areas of the cage 2 have a width b. The width B is at least 50% of the diameter D of the balls, preferably at least 60% of the diameter D of the balls. The width b should preferably be at most 90% of the width B of the cage 2. Thus, the width B should be equal to or greater than 50% of the diameter D of the balls, preferably equal to or greater than 60% of the diameter D of the balls, whereas the width b is preferably equal to or less than 90% of the width B of the cage 2.

The present invention helps ensure that the injection moldable thermoplastic material customarily used for producing linear bearing cages does not "freeze" too rapidly when it is injected into the injection tool because the cage 2 is designed to be relatively compact and massive.

Figure 20:
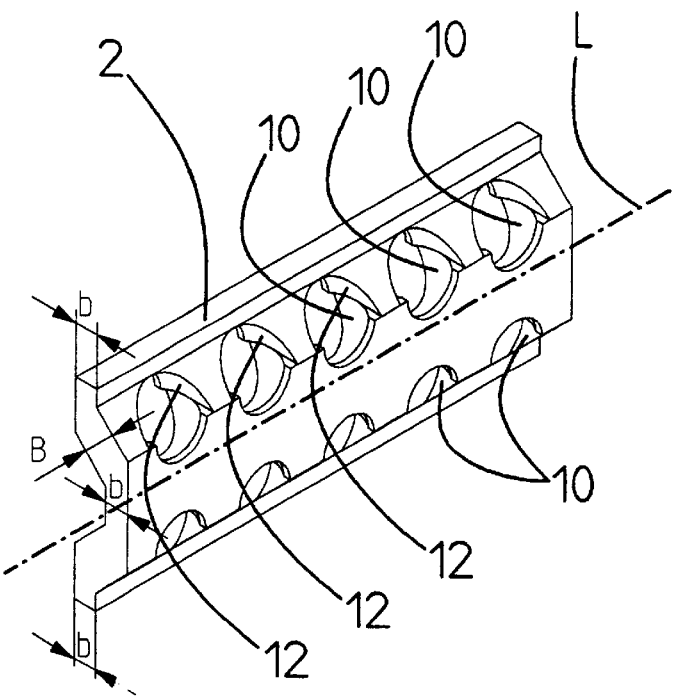
FIG. 20 is a perspective view of the cage used in the bearing shown in FIG. 19.
Figure 21:
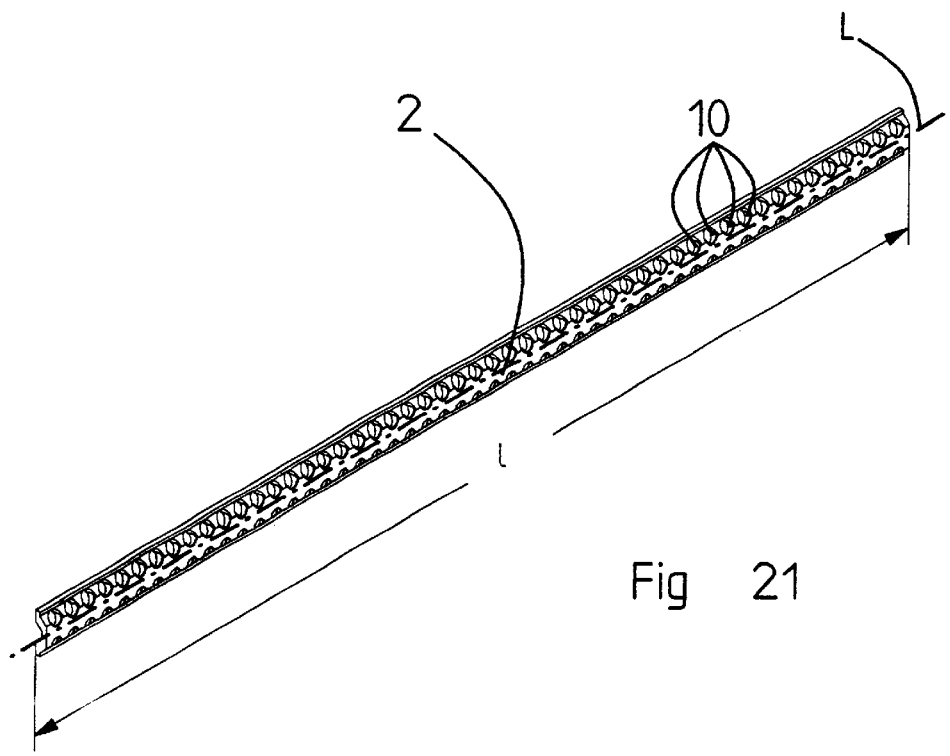
FIG. 21 is a perspective view of the full length of the linear bearing cage.

The cage 2 produced in accordance with the present invention, but without the balls inserted, is illustrated in FIGS. 20 and 21. As seen from FIG. 20, the holding protrusions or holding projections 12 are integrated in a unitary manner into the receiver pockets 10 so that the protrusions 12 are formed in one piece and at the same time as the receiver pockets 10. As illustrated in FIGS. 20 and 21, the receiver pockets 10 are arranged in two rows of pockets extending parallel to the longitudinal axis of the cage 2. The holding protrusions 12 do not extend out of the basic geometry of the cage 2, the basic geometry of the cage 2 being defined as the cage contour which would result without the receiver pockets 10 formed in it. Thus, the holding protrusions 12 do not extend outwardly beyond the side faces of the cage 2. Accordingly, the protrusions 12 cannot easily "freeze" during injection molding. In this way, it is ensured that the holding protrusions 12 have the exact desired geometry.

It can be seen from FIG. 21 that the cage 2 has a very great length 1 in relation to the dimension of its width. This illustrates the problems in injection molding mentioned above, because with conventional injection of thermoplastic molten material into an injection molding tool, such a geometry would unavoidably result in "freezing" of the material so that a complete filling of the tool cavity would be prevented. This applies in particular to those injection elements which project out of the geometry of the cage, such as described in connection with prior art cages. The cage preferably possesses a length that is at least thirty times the diameter of the rolling elements that are received in the receiving pockets.

The length/thickness ratio of the cage has an affect on the flowability of the plastic material in the injection molding tool. If the cage 2 represented in FIG. 20 or FIG. 21 is compared with a conventional thinner cage, it becomes immediately clear that in the case represented the length/thickness ratio is much lower and the injection-molding process is thereby aided and eased. When the cage is produced using a tool having a relatively long and thin cavity for the cage, problems may arise in that the molten resin may not reach the end of the cavity, but rather "freezes" before reaching the end. Thus, the length/thickness ratio of the cage is significant from the standpoint of the flowability of the molten plastic material in the injection molding tool and the prevention of freezing.

As can be particularly seen when comparing the cage shown by way of example in FIG. 21 with the known cage designs represented in FIGS. 1–4, it is now possible by virtue of the present invention to reduce the division or spacing of adjacent rolling bodies from each other, thus making it possible to house more rolling bodies per unit of length of the cage. Consequently, it is advantageously possible to increase the supporting ability of the linear bearing. In accordance with a particularly preferred form of the invention, the receiver pockets are sized to receive rolling elements having a diameter less than 3 mm.

The linear bearing cage is formed in one piece, at the same time, and as a unitary structure. The cage is thus devoid of any parting line as is the case of the two piece cages illustrated in FIGS. 1–4. Also, the protrusions 7, 8 associated with each of the tool halves are fixedly connected to the respective tool half.

The protrusions are preferably devoid of any undercuts, thus allowing the cage to be freely unmolded after the injection molding process. A relatively simple unmolding of the finished injection-molded cage can thus be performed without having to rely on the elasticity of the cage material. Also, each of the protrusions 7, 8 constitutes one-half of the respective receiving pocket that receives the rolling element, and the cage is made of an injection-molded plastic material, preferably an injection-molded thermoplastic material.

The present invention thus provides an injection molding tool that is able to produce a cages with a relatively exact shaping of the holding projections as well as the stop faces for the rolling bodies. The injection molding tool has a design that is much simpler than other known injection molding tools, thereby allowing tools to be produced in a more cost effective manner. Also, by virtue of the present invention, it is possible to produce rolling bearing cages for use in linear bearings in such a way that relatively long cages, particularly suited for receiving very small balls or rollers, can be reliably and reproducibly made.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An injection molding tool for producing a one-piece cage for a linear bearing in which several rolling elements are positioned in the one-piece cage in a direction along a longitudinal extent of the one-piece cage, the injection molding tool comprising first and second tool halves between which is defined a cavity of the tool which receives injection molding material during injection molding of the one-piece cage, the first tool half being provided with a plurality of first protrusions fixedly connected with the first tool half and extending into the cavity of the tool during the injection molding of the one-piece cage, the second tool half being provided with a plurality of second protrusions fixedly connected with the second tool half and extending into the cavity of the tool during the injection molding of the one-piece cage, each of the first and second protrusions forming a portion of a receiver pocket which is adapted to receive one of the rolling elements, the first and second protrusions being configured to form holding projections associated with each receiver pocket and integrated with the cage for holding the rolling elements in the cage.

2. The injection molding tool in accordance with claim 1, wherein the first and second protrusions are devoid of undercuts.

3. The injection molding tool in accordance with claim 1, wherein each of said first and second protrusions has a first section forming the holding projections of the receiver pocket, a second section forming a rolling body section, and a third section forming a remaining portion of the receiver pocket.

4. The injection molding tool in accordance with claim 1, wherein each of said first and second protrusions constitute one-half of the receiver pocket.

5. The injection molding tool in accordance with claim 1, wherein the first protrusions are constituted by a first rail supported by the first tool half and the second protrusions are constituted by a second rail supported by the second tool half.

6. The injection molding tool in accordance with claim 5, wherein the first and second rails are identical in configuration.

7. The injection molding tool in accordance with claim 5, wherein each tool half supports at least two rails for forming the cage.

8. An injection molding tool for producing a one-piece cage for a linear bearing in which a plurality of rolling elements are arranged in a direction along a longitudinal axis of the bearing and are held in receiving pockets of the cage by holding projections, the injection molding tool comprising two tool halves between which is defined a cavity of the tool which receives injection molding material when the injection molding tool is closed during injection molding of the one-piece cage, the two tool halves each being provided with a plurality of protrusions that extend into the cavity of the tool during injection molding and form a portion of one of the receiver pockets for one of the rolling elements, one set of said protrusions being fixedly connected with one tool half and another set of protrusions being fixedly connected with the other tool half, the protrusions being shaped in such to act together during injection molding and form the holding projections in such a way that the holding projections are integrated into the cage, the protrusions being divided from one another, on a surface on which they lie next to each other when the injection molding tool is closed, at an angle of greater than zero degrees with respect to the closing direction of the injection molding tool.

9. The injection molding tool in accordance with claim 8, wherein the protrusions are devoid of undercuts.

10. The injection molding tool in accordance with claim 8, wherein each of said protrusions has a first section forming the holding projections of the receiver pocket, a second section forming a rolling body section, and a third section forming a remaining portion of the receiver pocket.

11. The injection molding tool in accordance with claim 8, wherein each of said protrusions constitutes one-half of the receiver pocket.

12. The injection molding tool in accordance with claim 8, wherein one set of said protrusions is constituted by a first rail supported by one tool half and a second set of protrusions is constituted by a second rail supported by the other tool half.

13. The injection molding tool in accordance with claim 12, wherein the first and second rails are identical in configuration.

14. The injection molding tool in accordance with claim 12, wherein each tool half supports at least two rails for forming the cage.

* * * * *